United States Patent
Kondrad et al.

(10) Patent No.: US 10,919,425 B1
(45) Date of Patent: Feb. 16, 2021

(54) UPPER HOOD ASSEMBLY FOR MOTOR VEHICLE SEATBACK

(71) Applicant: FORD GLOBAL TECHNOLOGIES, LLC, Dearborn, MI (US)

(72) Inventors: Marcos Silva Kondrad, Macomb Township, MI (US); Kevin Preuss, Berkley, MI (US); Kevin Mozurkewich, Milford, MI (US); Ryan Welch, Ottawa Lake, MI (US); Johnathan Line, Northville, MI (US); David Frederick Lyons, New Haven, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 33 days.

(21) Appl. No.: 16/540,152

(22) Filed: Aug. 14, 2019

(51) Int. Cl.
*B60N 2/68* (2006.01)
*B60N 2/803* (2018.01)
*B60N 2/80* (2018.01)

(52) U.S. Cl.
CPC ............. *B60N 2/803* (2018.02); *B60N 2/682* (2013.01); *B60N 2/686* (2013.01); *B60N 2002/899* (2018.02)

(58) Field of Classification Search
CPC .......... B60N 2/803; B60N 2/64; B60N 2/646; B60N 2/682; B60N 2/686; B60N 2/68; B60N 2/643; B60N 2002/899
USPC ...................... 297/391, 284.2, 396, 397, 399
See application file for complete search history.

(56) References Cited

U.S. PATENT DOCUMENTS

| | | | |
|---|---|---|---|
| 4,693,515 A | 9/1987 | Russo et al. | |
| 9,096,157 B2 | 8/2015 | Line et al. | |
| 9,649,963 B2 | 5/2017 | Line et al. | |
| 10,518,735 B2* | 12/2019 | Kondrad | B60N 2/6018 |
| 2005/0179299 A1 | 8/2005 | Yetukuri et al. | |
| 2012/0119551 A1* | 5/2012 | Brncick | B60N 2/646 |
| | | | 297/284.2 |
| 2013/0241255 A1* | 9/2013 | Kulkarni | B60N 2/028 |
| | | | 297/285 |
| 2017/0210257 A1 | 7/2017 | Kondrad et al. | |
| 2017/0214988 A1* | 7/2017 | Ferretti | B60N 2/829 |
| 2018/0037146 A1* | 2/2018 | Line | B60N 2/682 |
| 2018/0186259 A1* | 7/2018 | Line | B60N 2/68 |
| 2018/0186260 A1* | 7/2018 | Kondrad | B60N 2/22 |
| 2020/0122613 A1* | 4/2020 | McElroy | B60N 2/565 |

* cited by examiner

*Primary Examiner* — Mark R Wendell
(74) *Attorney, Agent, or Firm* — David Coppiellie; Price Heneveld LLP

(57) ABSTRACT

A seatback assembly includes a seatback support frame, a seatback trim assembly operably coupled with the seatback support frame, and a seatback rear panel operably coupled with the seatback support frame. An upper hood assembly is operably coupled with an upper portion of the seatback assembly, wherein the upper hood assembly comprises a bezel extending longitudinally between an upper portion of the seatback trim assembly and the seatback rear panel, the bezel having a forward outer edge downwardly disposed against and in juxtaposed relation with the seatback trim assembly and a rear outer edge downwardly disposed against and in juxtaposed relation with the seatback rear panel.

20 Claims, 10 Drawing Sheets

UPPER HOOD ASSEMBLY FOR MOTOR VEHICLE SEATBACK

FIELD OF THE INVENTION

The present invention generally relates to an apparatus and method for improving the appearance of a motor vehicle seating assembly and, more particularly, to an upper hood assembly adapted for installation on an otherwise built-up seatback assembly.

BACKGROUND OF THE INVENTION

Seating assemblies provided in motor vehicles are designed to provide a support platform to accommodate an occupant in a sitting position. When such seating assemblies are installed in motor vehicles, it is also desired that the seating assembly demonstrate quality and workmanship in manufacture and assembly.

SUMMARY OF THE INVENTION

According to one aspect of the present invention, a seatback assembly includes a seatback support frame, a seatback trim assembly operably coupled with the seatback support frame, and a seatback rear panel operably coupled with the seatback support frame. An upper hood assembly is operably coupled with an upper portion of the seatback assembly, wherein the upper hood assembly comprises a bezel extending longitudinally between an upper portion of the seatback trim assembly and the seatback rear panel, the bezel having a forward outer edge downwardly disposed against and in juxtaposed relation with the seatback trim assembly and a rear outer edge downwardly disposed against and in juxtaposed relation with the seatback rear panel.

Embodiments of the first aspect of the present disclosure can include any one or a combination of the following features:

The bezel defines an intentional interference to conceal a transition line on the upper portion of the seatback assembly between the seatback trim assembly and the seatback rear panel.

The transition line includes gaps between the seatback trim assembly and the seatback rear panel.

The seatback trim assembly comprises a lip disposed on an upper edge of the seatback trim assembly, wherein the lip is received beneath and behind the forward outer edge of the bezel.

The upper hood assembly comprises a head restraint armature and the head restraint armature and the bezel are integrally fabricated from a polymeric material.

The upper hood assembly comprises a head restraint received within the head restraint armature.

The seatback trim assembly comprises a pair of lips disposed on an upper edge of the seatback trim assembly and the upper hood assembly further comprises a pair of bezels, wherein one of each of the pair of lips and one each of the pair of bezels is disposed on opposed sides of the head restraint and each of the pair of lips is received beneath and behind the forward outer edge of one of the pair of bezels.

The head restraint further comprises a vertically depending pair of posts and the upper hood assembly is operably coupled with an upper portion of the seatback support frame via the vertically depending pair of posts of the head restraint.

The seatback support frame of the seatback assembly further comprises a pair of head restraint guides that receive the pair of vertically depending posts of the head restraint of the upper hood assembly.

The seatback trim assembly comprises a seatback foam pad disposed upon the front portion of the seatback support frame and a trim cover disposed over the seatback foam pad.

The upper portion of the seatback trim assembly is substantially resilient and the bezel of the upper hood assembly is displaced into the seatback trim assembly when assembled to conceal an upper transition line between the seatback trim assembly and the seatback rear panel.

According to another aspect of the present invention, a seatback assembly includes a seatback support frame, a seatback trim assembly operably coupled with a front portion of the seatback support frame, and a seatback rear panel operably coupled with a rear portion of the seatback support frame. An upper hood assembly is operably coupled with an upper portion of the seatback assembly, wherein the upper hood assembly comprises a head restraint received within a head restraint armature and a bezel incorporated into the upper hood assembly, the bezel being disposed and extending longitudinally between an upper portion of the seatback trim assembly and the seatback rear panel, and the bezel having a forward outer edge downwardly disposed against and in juxtaposed relation with the seatback trim assembly and a rear outer edge downwardly disposed against and in juxtaposed relation with the seatback rear panel.

Embodiments of the second aspect of the present disclosure can include any one or a combination of the following features:

The upper hood assembly comprises a forward clam shell housing, a rear clam shell housing, and a substantially U-shaped frame member having a pair of vertically depending posts received within and secured between the forward clam shell housing and the rear clam shell housing, wherein the head restraint is operatively coupled with and supported by the substantially U-shaped frame member.

head restraint armature and the bezel are each integrally incorporated into and defined by each of the forward clam shell housing and the rear clam shell housing when the forward clam shell housing and the rear clam shell housing are assembled.

The upper hood assembly comprises a pair of bezels defining a pair of wings, each of the pair of wings extending substantially laterally outwardly from the seatback assembly and having a concealable fastening opening by which each of the pair of wings is attached to the seatback assembly.

The seatback support frame of the seatback assembly further comprises a pair of head restraint guides that receive the pair of vertically depending posts of the upper hood assembly, and the seatback trim assembly further comprises a pair of lips disposed on an upper edge of the seatback trim assembly, wherein one of each of the pair of lips is disposed on opposed sides of the pair of vertically depending posts and each of the pair of lips is received beneath and behind the forward outer edge of one of the pair of bezels.

The head restraint armature and the pair of bezels of the upper hood assembly further define a pair of handles disposed proximate and on opposed sides of the head restraint.

According to yet another aspect of the present invention, a method is disclosed for assembling a seatback assembly comprising the steps of: providing a seatback support frame; attaching a seatback trim assembly over a front portion of the seatback support frame; attaching a seatback rear panel over a rear portion of the seatback support frame; and installing an upper hood assembly having a plastic bezel after the seatback trim assembly and seatback rear panel have been attached to the seatback support frame, wherein the plastic bezel of the upper hood assembly is disposed over an upper portion of the seatback trim assembly and the seatback rear panel, and whereby a forward outer edge of the plastic bezel is downwardly urged against the seatback trim assembly and a rear outer edge downwardly disposed against and in juxtaposed relation with the seatback rear panel to conceal a transition line between the seatback trim assembly and the seatback rear panel.

Embodiments of the third aspect of the present disclosure can include any one or a combination of the following features:

The hood assembly further comprises a forward clam shell housing, a rear clam shell housing, and a substantially U-shaped frame member having a pair of vertically depending posts received within and secured between the forward clam shell housing and the rear clam shell housing, wherein a head restraint is operatively coupled with and supported by the substantially U-shaped frame member; the seatback assembly further comprises a pair of head restraint guides that receive the pair of vertically depending posts of the upper hood assembly; and the step of installing the upper hood assembly further comprises the step of inserting the pair of vertically depending posts of the upper hood assembly into the pair of head restraint guides until the vertically depending posts of the upper hood assembly are seated within the pair of head restraint guides and the forward outer edge of the plastic bezel of the upper hood assembly is displaced into the seatback trim assembly to conceal an upper transition line between the seatback trim assembly and the seatback rear panel.

The head restraint is received within a head restraint armature and the head restraint armature and the plastic bezel are each integrally incorporated in and defined by each of the forward clam shell housing and the rear clam shell housing when the forward clam shell housing and the rear clam shell housing are assembled.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
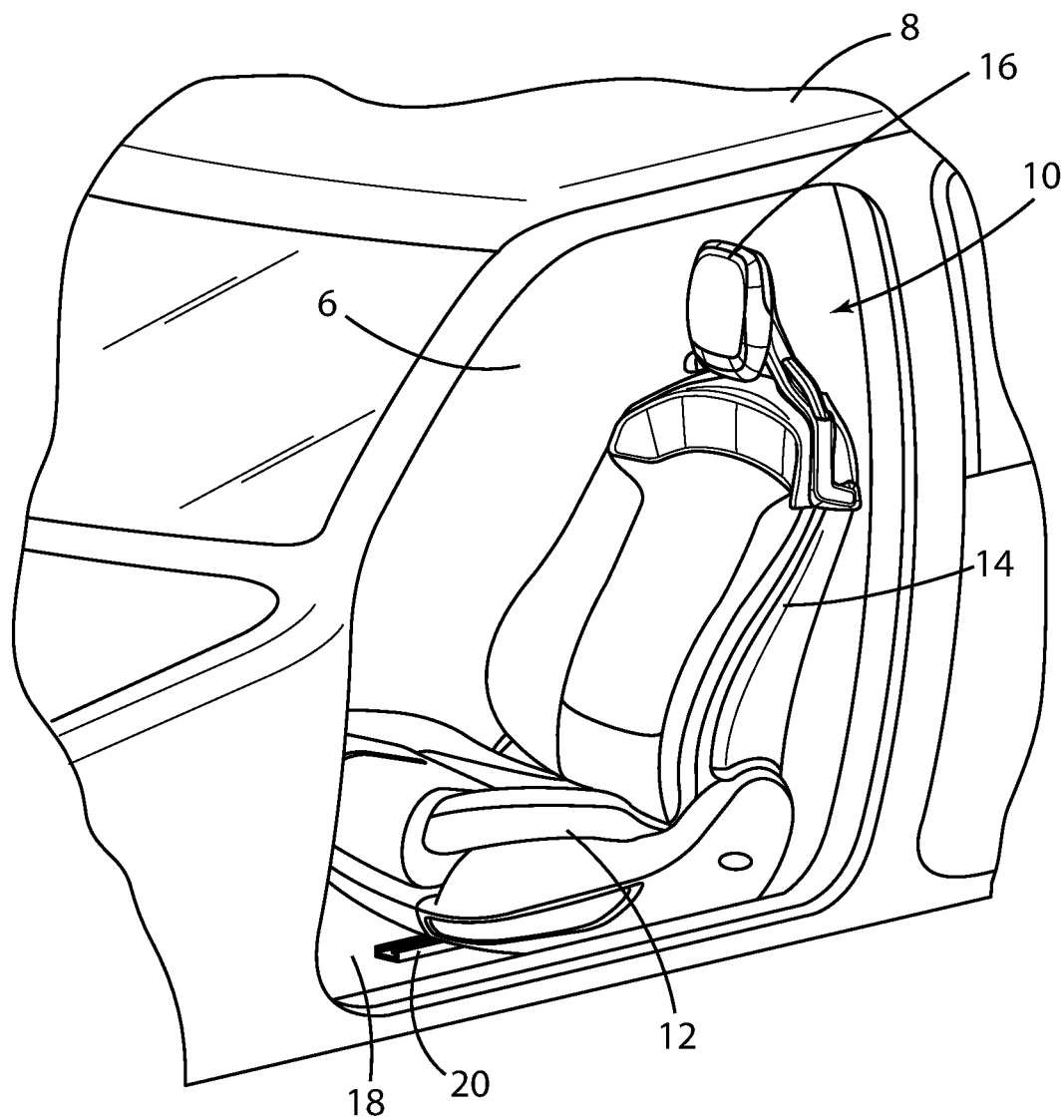
FIG. 1 is a front side perspective view of an automotive seat assembly installed in a motor vehicle in accordance with the present disclosure.
Figure 2:
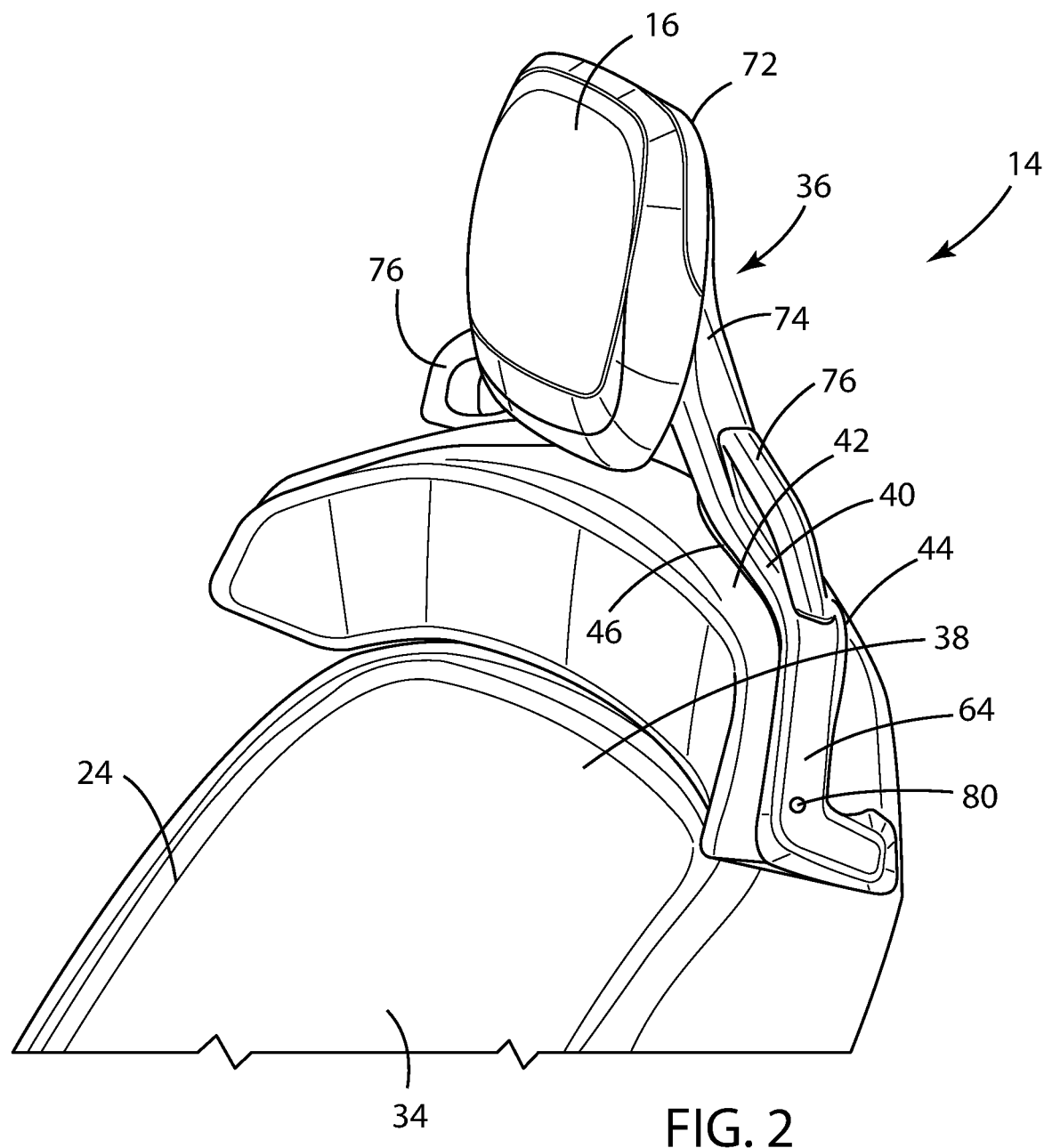
FIG. 2 is a front side perspective view of an upper portion of the seatback assembly of the automotive seat assembly of FIG. 1.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIG. 1, reference numeral 10 generally designates a vehicle seating assembly for use in a vehicle cabin 6 of a motor vehicle 8. The motor vehicle seating assembly 10 includes a lower seating structure 12 pivotably coupled to a raised seatback assembly 14. As shown in FIG. 1, the motor vehicle seating assembly 10 may be configured for use in a variety of motor vehicles 8 in a variety of seating positions, such as a front driver seat, a front passenger seat, or a rear seat of the motor vehicle 8, all of which may include the aforementioned lower seating structure 12 and raised seatback assembly 14. A head restraint 16 is also mounted to the top of the raised seatback assembly 14, as discussed in further detail below.

The motor vehicle seating assembly 10 may be configured to be mounted on a support surface, such as a floor pan 18 of the motor vehicle 8. A seat track assembly 20 may be coupled to the lower seating structure 12 to facilitate fore and aft positioning of the motor vehicle seating assembly 10, as is known. The motor vehicle seating assembly 10 is generally designed for the comfort of a motor vehicle occupant.

As shown in FIGS. 2-6 and 9-10, the seatback assembly 14 generally includes a seatback support frame 22, a seatback trim assembly 24 operably coupled with the seatback support frame 22, and a seatback rear panel 26 operably coupled with the seatback support frame 22. The seatback support frame 22 may be fabricated from metal, such as steel or aluminum alloys, or it may be fabricated from rigid polymer composites. The seatback support frame 22 may also be formed in a variety of shapes and configurations in order to support the seatback trim assembly 24 and the seatback rear panel 26 as described herein.

Figure 9:
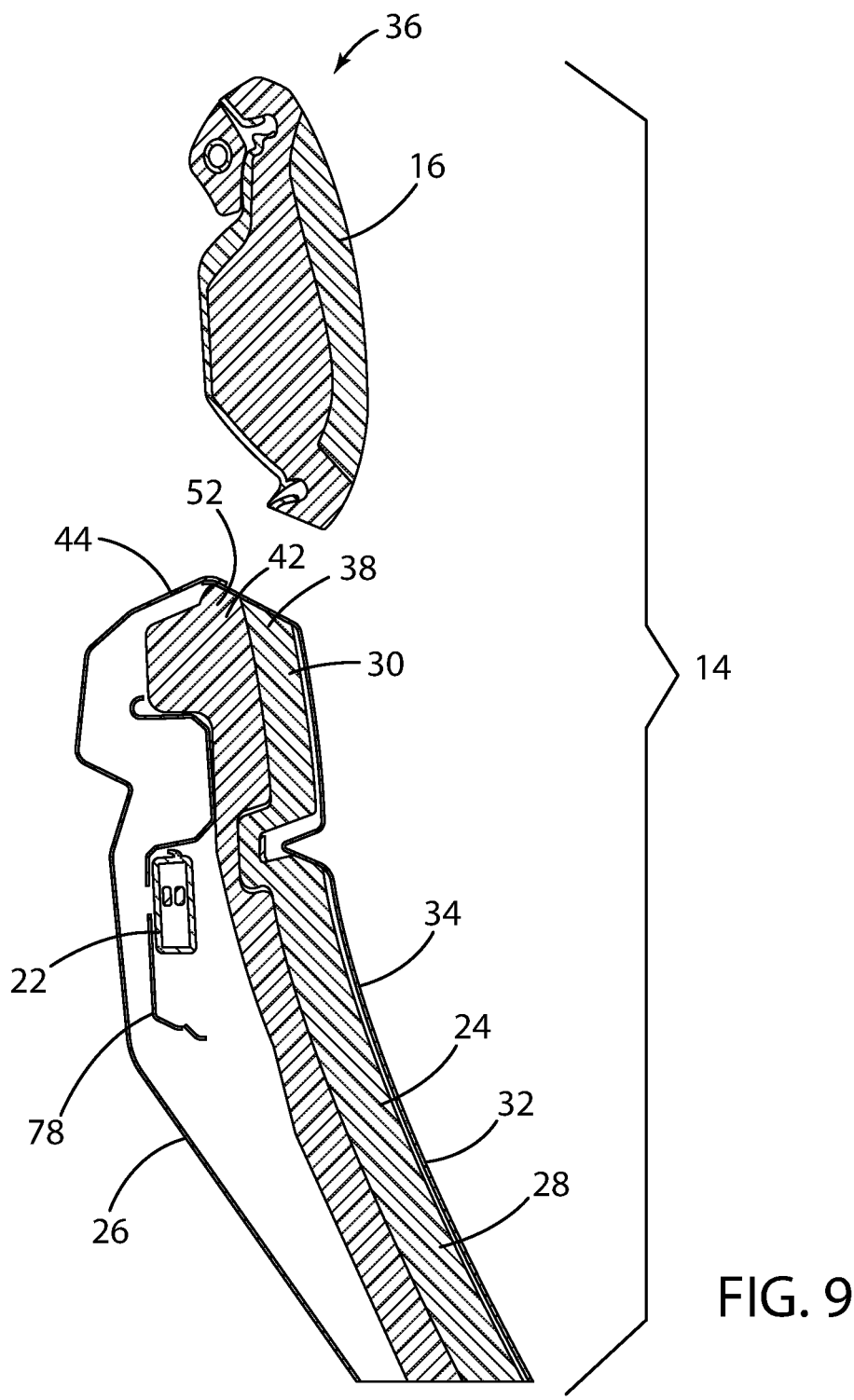
FIG. 9 is a cross-sectional view of the upper hood assembly and the upper portion of the seatback assembly of the automotive seat assembly of FIG. 1 taken along the line IX-IX in FIG. 5.
Figure 10:
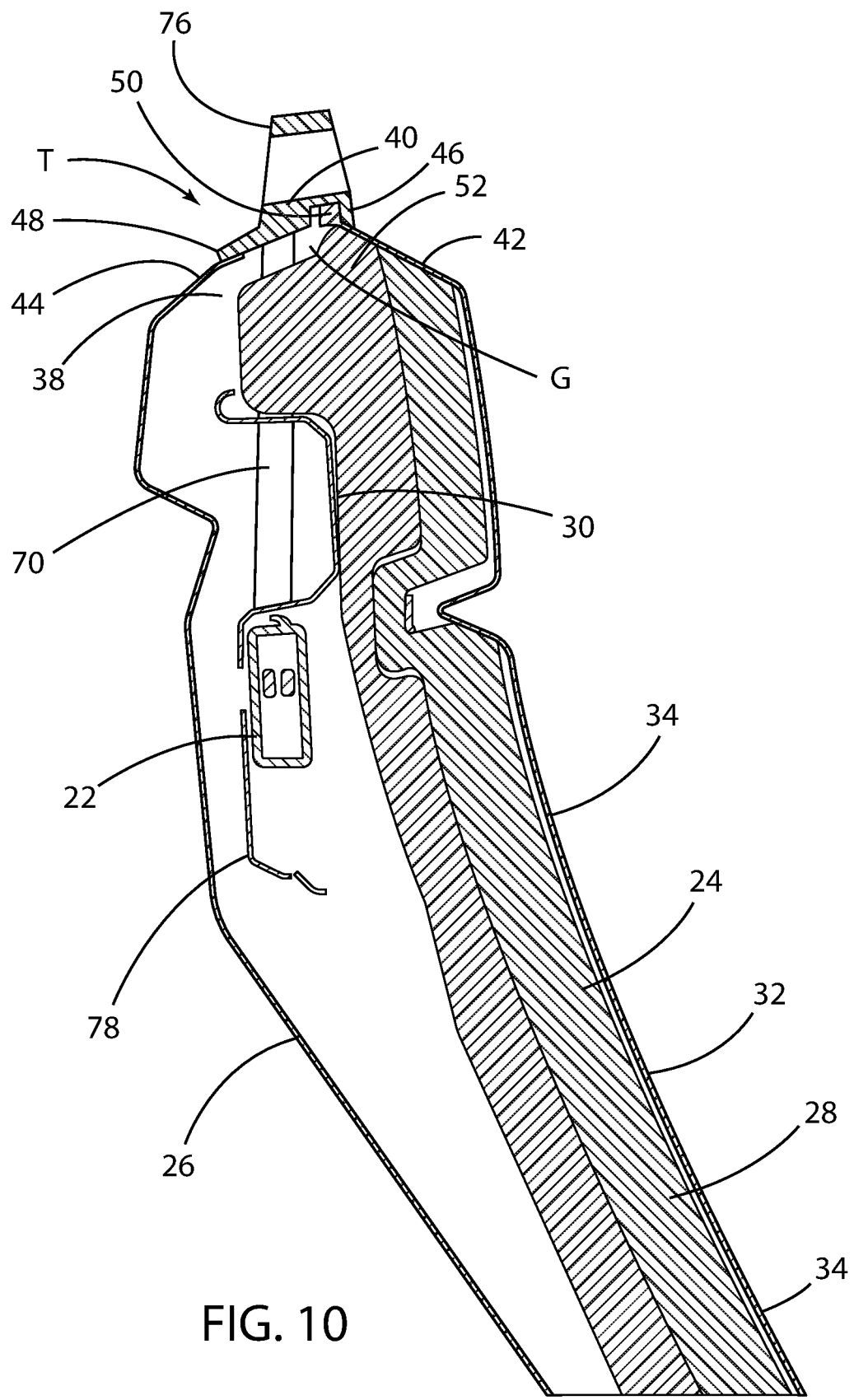
FIG. 10 is a cross-sectional view of the upper hood assembly and the upper portion of the seatback assembly of the automotive seat assembly of FIG. 1 taken along the line X-X in FIG. 5.

The seatback trim assembly 24 may include a seatback foam pad 28 disposed upon the front portion 30 of the seatback support frame 22 and a trim cover 32 disposed over the seatback foam pad 28, as shown in FIGS. 9-10. The seatback trim assembly 24 so assembled defines an exposed front surface 34. Preferably, the exposed front surface 34 of trim cover 32 comprises a locally flexible/stretch trim material, such as leather, vinyl, or cloth, that together with the seatback foam pad 28, creates a substantially resilient exposed front surface 34 of the seatback trim assembly 24.

The seatback rear panel 26 may also be fabricated from rigid polymer composites, and it may also be formed in a variety of shapes and configurations. For example, the seatback rear panel 26 may be formed by compression molding and may comprise composite thermoplastics compression molded with unidirectional tapes, woven fabrics, randomly oriented fiber mat, or chopped strand.

In contrast to the present disclosure, prior seatback assemblies 14 may have employed an enveloped seat cover design. This design approach required that an enveloped style trim cover, including the front, rear, and side surfaces, be slipped down over top and down both the front and the rear of the seatback foam pad and seatback support frame after these components were assembled. Since the trim cover had to be very tight, sliding such an enveloped style trim cover downwardly over the upper portion and vertical length of the built-up seatback assembly 14 is strenuous and may require a secondary machine to complete the operation.

The present disclosure avoids the aforementioned assembly process and its shortcomings by the use of the seatback assembly 14 that includes the seatback support frame 22 to which each of the seatback trim assembly 24 and the seatback rear panel 26 are sequentially and operably coupled. Thus, the seatback rear panel 26 becomes a secondary component, and is not incorporated with the seatback trim assembly 24. The seatback rear panel 26 can be thus installed and removed separately from the seatback trim assembly 24, making assembly of the seatback assembly 14 much easier.

As a further finishing feature of the present disclosure, an upper hood assembly 36 may be operably coupled with an upper portion 38 of the seatback assembly 14. Since the upper portion 38 of the seatback assembly 14 is often the first thing in the line of sight of a potential customer when getting into a vehicle for the first time, it is particularly desirable that this portion of the motor vehicle seating assembly 10 be aesthetically pleasing and finished in appearance.

To this end, the upper hood assembly 36 may include an integrated bezel 40 extending longitudinally relative the length of the motor vehicle 8 between an upper portion 42 of the seatback trim assembly 24 and an upper portion 44 of the seatback rear panel 26. As perhaps best shown in FIG. 10, the bezel 40 has a forward outer edge 46 downwardly disposed against and in juxtaposed relation with the upper portion 42 of the seatback trim assembly 24 and a rear outer edge 48 downwardly disposed against and in juxtaposed relation with the upper portion 44 of the seatback rear panel 26.

Figure 7:
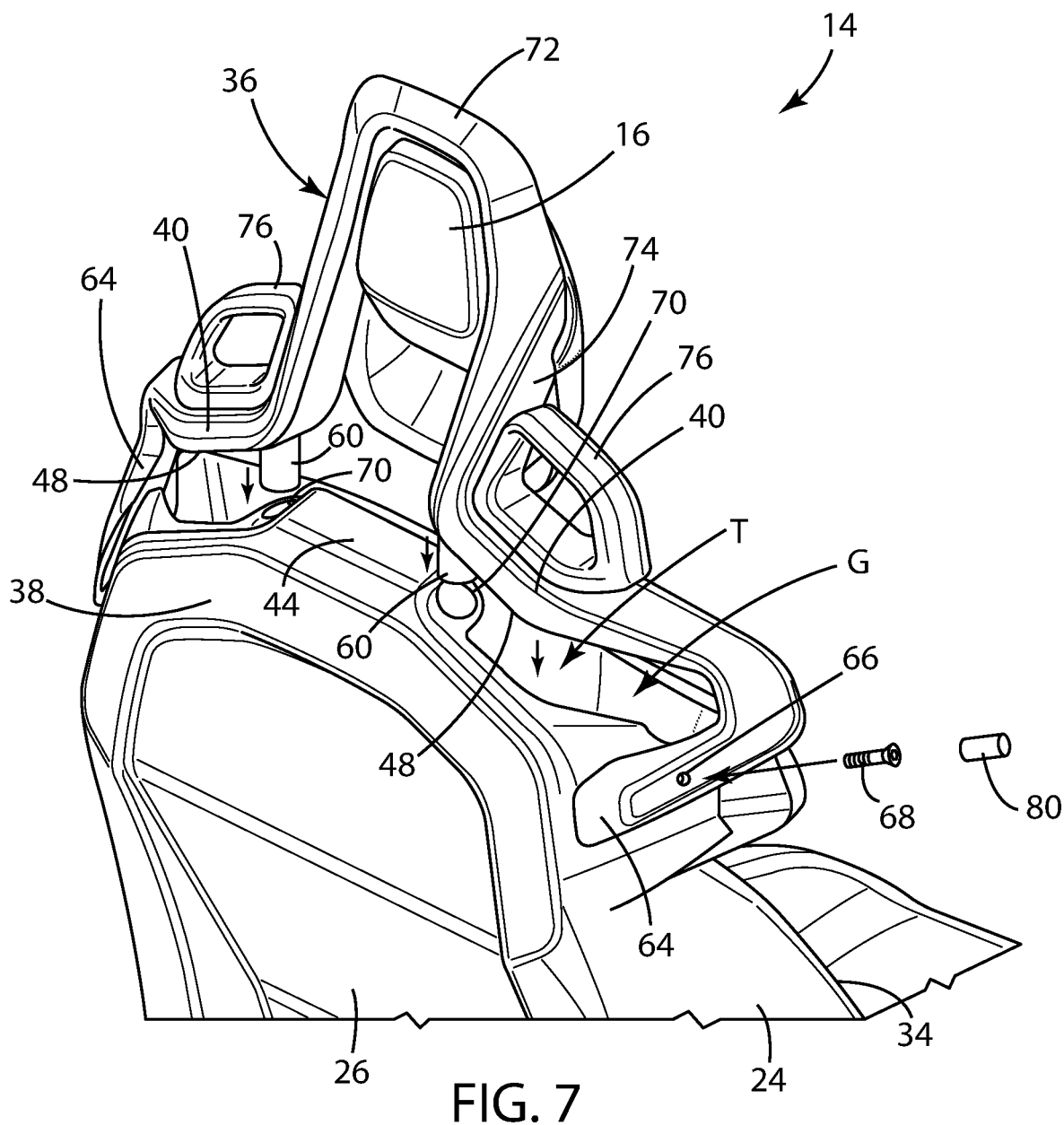
FIG. 7 is a rear side perspective view of the upper hood assembly and the upper portion of the seatback assembly of the automotive seat assembly of FIG. 1 prior to assembly.
Figure 8:
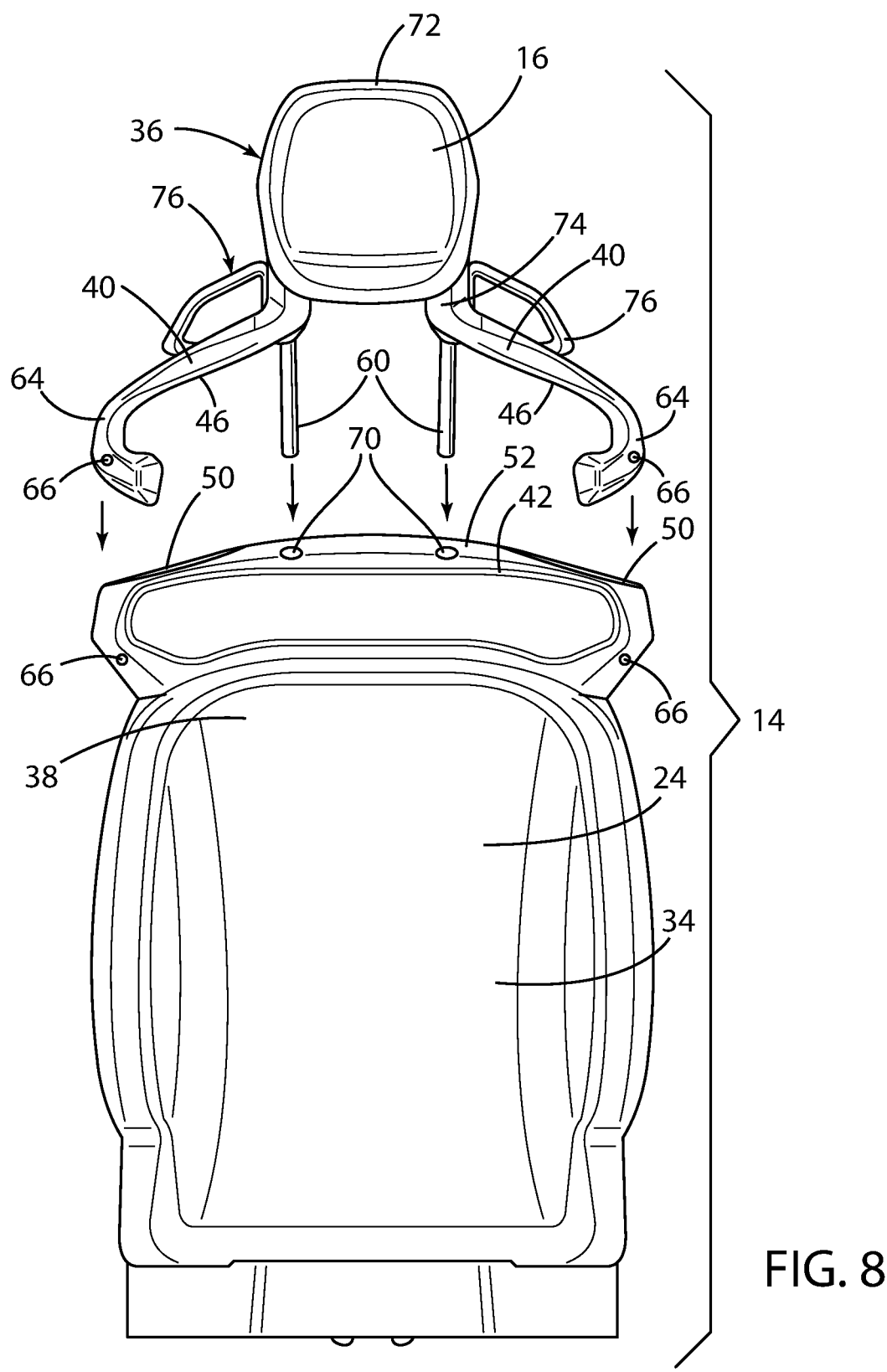
FIG. 8 is a front view of the upper hood assembly and the upper portion of the seatback assembly of the automotive seat assembly of FIG. 1 prior to assembly.

The bezel 40 thus defines an intentional interference to conceal a transition line T on the upper portion 38 of the seatback assembly 14 between the upper portion 42 of the seatback trim assembly and the upper portion 44 of the seatback rear panel 26, as seen in FIG. 7. This is particularly advantageous where the transition line T includes gaps G between the upper portion 42 of the seatback trim assembly 24 and the upper portion 44 of the seatback rear panel 26. That is, since the upper portion 42 of the seatback trim assembly 24 is substantially resilient, the bezel 40 of the upper hood assembly 36 is displaced into the seatback trim assembly 24 when assembled to conceal the transition line T between the seatback trim assembly 24 and the seatback rear panel 26.

In addition, to providing an even more finished appearance, the seatback trim assembly 24 may also include a lip 50 disposed on an upper edge 52 of the seatback trim assembly 24, wherein the lip 50 is received beneath and behind the forward outer edge 46 of the bezel 40, as shown in FIG. 10. Alternatively, or in addition to, the lip 50, the bezel 40 of the upper hood assembly 36, the seatback trim assembly 24, and seatback rear panel 26 are designed in such a way that the upper hood assembly 36 bites down into the seatback trim assembly 24 and is in full contact with and overlaps the seatback rear panel 26, via a designed interference, to hide the transition line T between the relatively resilient seatback trim assembly 24 and the relatively hard seatback rear panel 26, as shown in FIG. 10.

Figure 3:
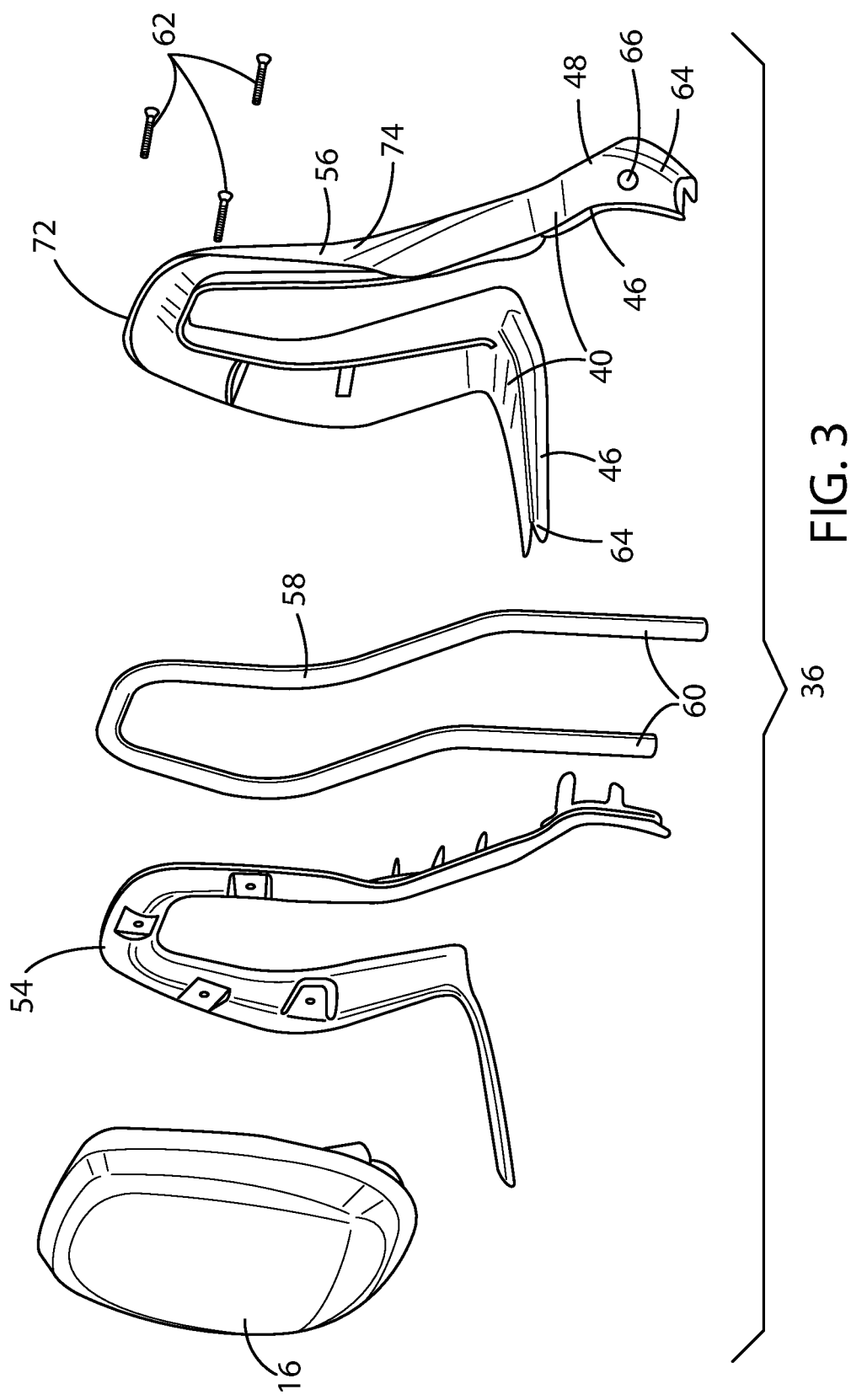
FIG. 3 is a front side perspective exploded view of an upper hood assembly of the seatback assembly of the automotive seat assembly of FIG. 1.
Figure 4:
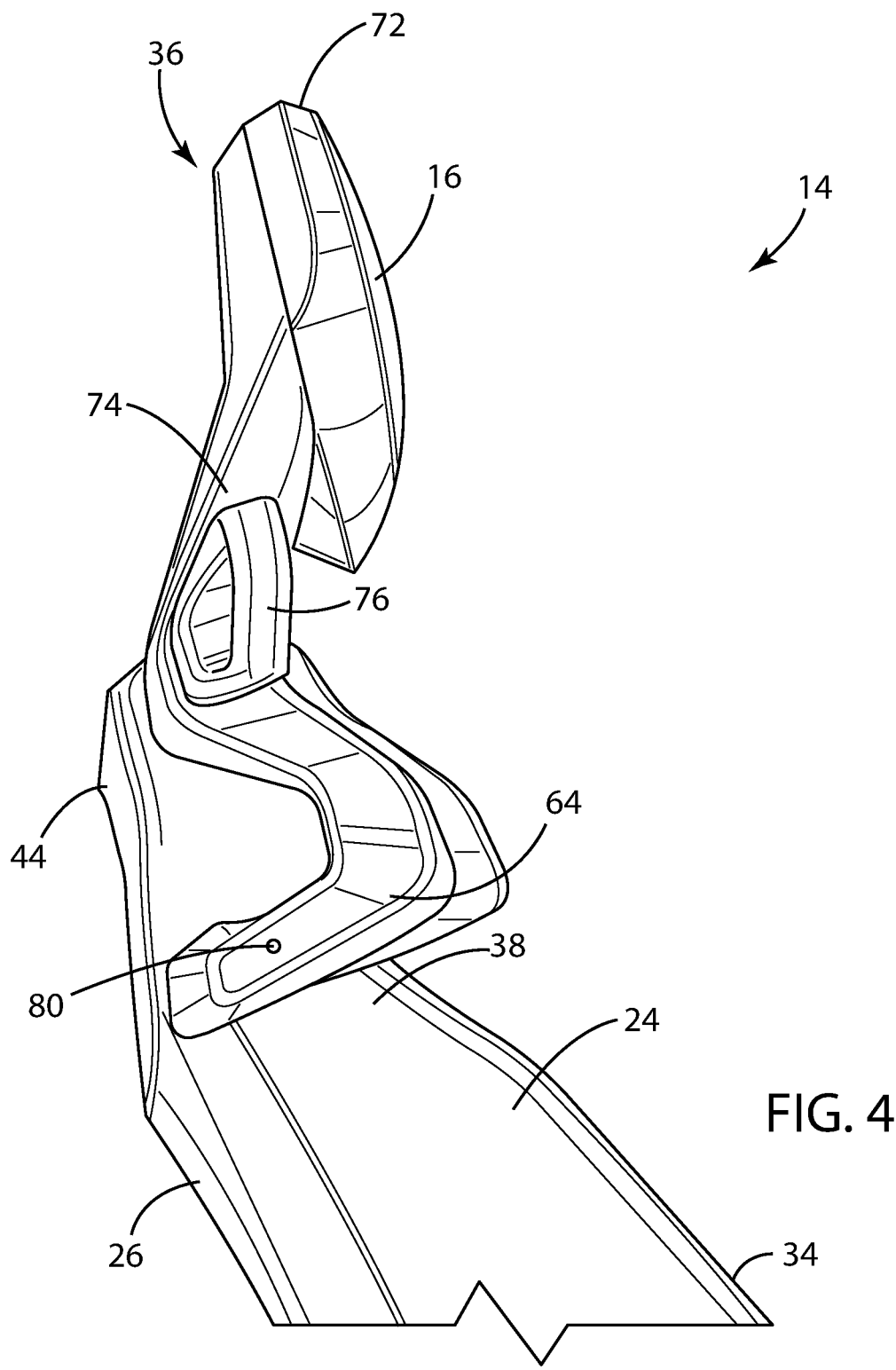
FIG. 4 is a side view of the upper portion of the seatback assembly of the automotive seat assembly of FIG. 1.
Figure 5:
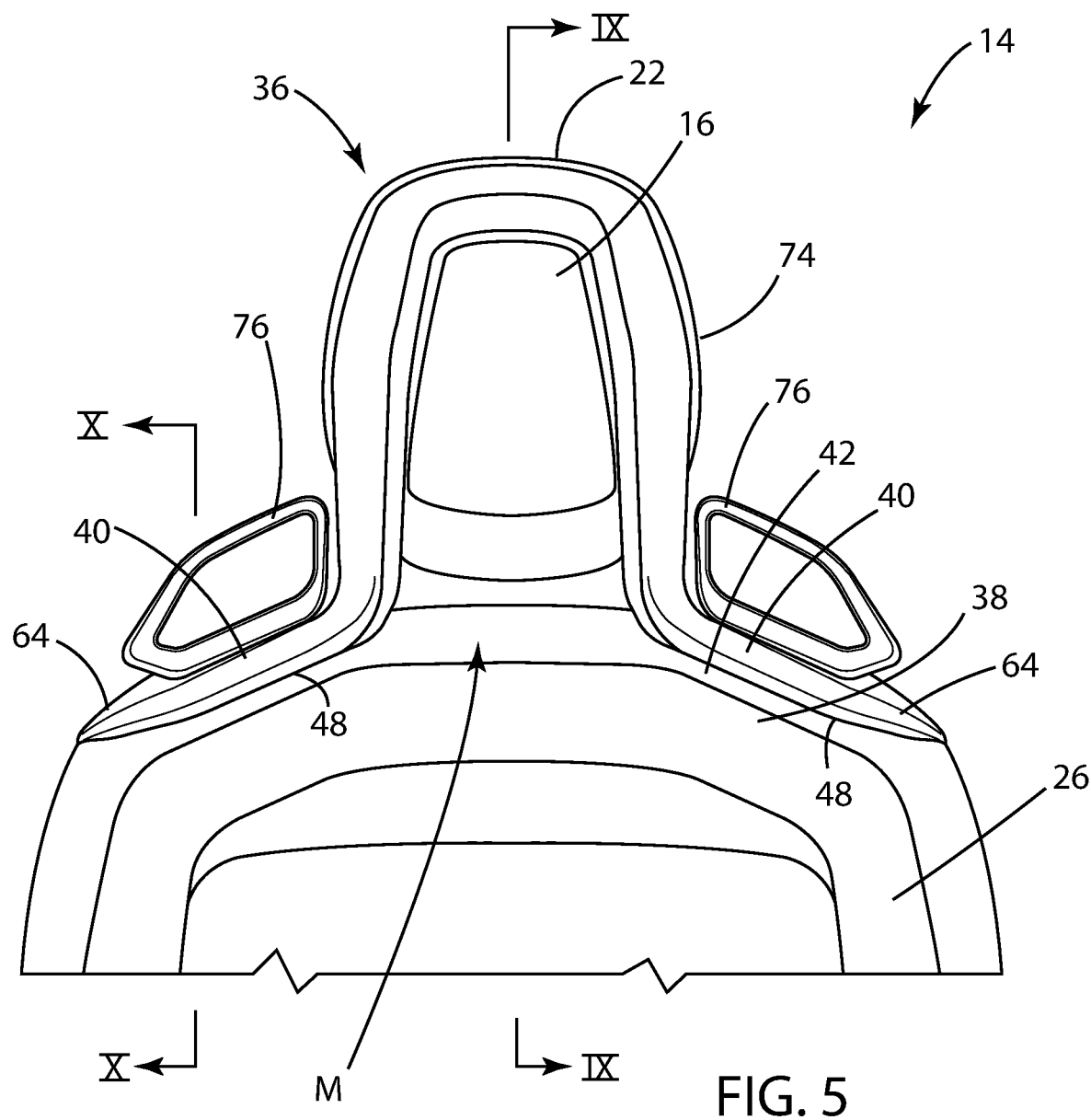
FIG. 5 is a rear view of the upper portion of the seatback assembly of the automotive seat assembly of FIG. 1.
Figure 6:
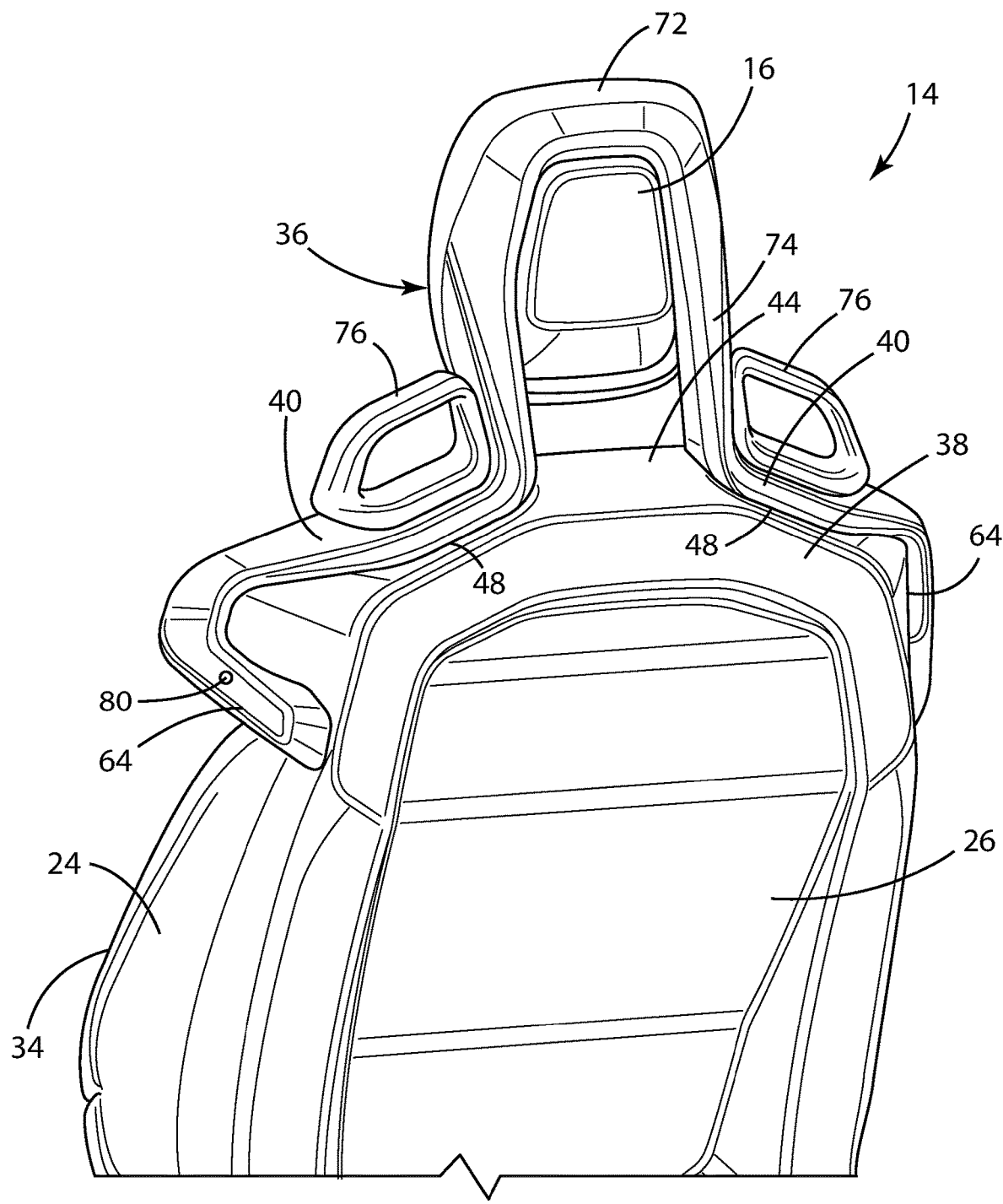
FIG. 6 is a rear side perspective view of the upper portion of the seatback assembly of the automotive seat assembly of FIG. 1.

To facilitate its construction, the upper hood assembly 36 may comprise a forward clam shell housing 54, a rear clam shell housing 56, and a substantially U-shaped frame member 58 having a pair of vertically depending posts 60 received within and secured between the forward clam shell housing 54 and the rear clam shell housing 56 via hood fasteners 62, as shown in FIG. 3. Further, as shown in FIG. 3, the head restraint 16 may be operatively coupled with and supported by the substantially U-shaped frame member 58 of the upper hood assembly 36. The seatback support frame 22 of the seatback assembly 14 further may also include a pair of head restraint guides 70 that receive the pair of vertically depending posts 60 of the upper hood assembly 36, by which the upper hood assembly 36 may be assembled onto and operably coupled with seatback support frame 22 proximate the upper portion 38 of the seatback assembly 14. In addition, an upper portion 72 of the upper hood assembly 36 may be adapted to define a head restraint armature 74 within which the head restraint 16 is received.

Depending on the studio design objectives of the motor vehicle seating assembly 10, the seatback assembly 14 may include a pair of bezels 40 defining a pair of wings 64, each of the pair of wings 64 extending substantially laterally outwardly from the seatback assembly 14 and having a concealable fastener opening 66 by which each of the pair of wings 64 is attached to the seatback assembly 14 via a wing fastener 68. Similarly, the seatback trim assembly 24 may include a pair of lips 50 disposed on either side of the upper edge 52 of the seatback trim assembly 24, wherein one of each of the pair of lips 50 is disposed on opposed sides of the pair of vertically depending posts 60 of the upper hood assembly 36 and each of the pair of lips 50 is received beneath and behind the forward outer edge 46 of one of the pair of bezels 40.

The transition line T located at the middle region M of the upper portion 38 of the seatback assembly 14 and beneath the head restraint 16, as shown in FIG. 9, may be assembled without the bezel 40 present, and instead rely upon the upper portion 44 of the seatback rear panel 26 to overlap the upper portion 42 of the seatback trim assembly 24. The middle region M is typically of relatively narrow width not typically subject to being disturbed and is largely hidden from view by the head restraint 16 and head restraint armature 74.

In addition, as shown in FIGS. 1-2, 4-8, and 9, an embodiment of the head restraint armature 74 and the pair of bezels 40 of the upper hood assembly 36 may further define a pair of handles 76 disposed proximate and on opposed sides of the head restraint 16 by which the seatback assembly 14 may be grasped by a user and moved forward or rearward, particularly in the case of a motor vehicle seating assembly 10 placed in a front seat position of the two-door motor vehicle 8. The embodiment of FIG. 3 does not include handles 76.

The forward clam shell housing 54 and the rear clam shell housing 56 of the upper hood assembly 36, including the bezel 40 and head restraint armature 74, may be fabricated from a composite polymeric material, such as polyphenylene oxide (PPO). The bezel 40 and the head restraint armature 74 are thus each integrally incorporated into and defined by each of the forward clam shell housing 54 and the rear clam shell housing 56 when the forward clam shell housing 54 and the rear clam shell housing 56 are assembled.

Once assembled, the upper hood assembly 36 may be installed in the built-up seatback assembly 14. That is, the seatback trim assembly 24 is attached over a front portion 30 of the seatback support frame 22 and the seatback rear panel 26 is attached over a rear portion 78 of the seatback support frame 22. The upper hood assembly 36, within which the bezel 40 is incorporated, is installed by inserting the pair of vertically depending posts 60 of the upper hood assembly 36 into the pair of head restraint guides 70 until the vertically depending posts 60 of the upper hood assembly 36 are seated within the pair of head restraint guides 70 and the forward outer edge 46 of the bezel 40 of the upper hood assembly 36 is displaced into the seatback trim assembly 24 and downwardly urged against the lip 50 of the seatback trim assembly 24 and a rear outer edge 48 is downwardly disposed against and in juxtaposed relation with the seatback rear panel 26 to conceal the transition line T between the seatback trim assembly 24 and the seatback rear panel 26. The wing fasteners 68 can then be installed in each of the wings 64 to secure the upper hood assembly 36. Cover plugs 80 may be inserted in the concealable fastener openings 66 to conceal the wing fasteners 68 and thereby create a more aesthetically pleasing and finished appearance.

The seatback assembly 14 thus described uniquely resolves the problem of assembly of the seatback assembly 14 by the use of an upper hood assembly 36 that includes a bezel 40 extending longitudinally between an upper portion 42, 44 of the seatback trim assembly 24 and the seatback rear panel 26, respectively, the bezel 40 having a forward outer edge 46 downwardly disposed against and in juxtaposed relation with the seatback trim assembly 24 and a rear outer edge 48 downwardly disposed against and in juxtaposed relation with the seatback rear panel 26.

The upper hood assembly 36 may be installed after the seatback trim assembly 24 and the seatback rear panel 26 have been installed on the seatback support frame 22. The upper hood assembly 36 may be slid into the head restraint guides 70, in a manner similar to traditional head restraints, and may be additionally used to provide a more aesthetically pleasing and finished appearance to the upper portion 38 of the seatback assembly 14. The seatback assembly 14 thus described allows for unique styling of the motor vehicle seating assembly 10, while also making assembly of the seatback assembly 14 of the motor vehicle seating assembly 10 at the assembly plant easier by reducing the effort to build-up the motor vehicle seating assembly 10, while at the same time eliminating visible seams and gaps between the seatback trim assembly 24 and seatback rear panel 26.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "operably connected" generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

We claim:

1. A seatback assembly comprising:
a seatback support frame;
a seatback trim assembly operably coupled with the seatback support frame;
a seatback rear panel operably coupled with the seatback support frame; and
an upper hood assembly operably coupled with an upper portion of the seatback assembly, wherein the upper hood assembly comprises a bezel extending longitudinally between an upper portion of the seatback trim assembly and the seatback rear panel, the bezel having a forward outer edge downwardly disposed against and in juxtaposed relation with the seatback trim assembly and a rear outer edge downwardly disposed against and in juxtaposed relation with the seatback rear panel.

2. The seatback assembly of claim 1, wherein the bezel defines an intentional interference to conceal a transition line on the upper portion of the seatback assembly between the seatback trim assembly and the seatback rear panel.

3. The seatback assembly of claim 2, wherein the transition line includes gaps between the seatback trim assembly and the seatback rear panel.

4. The seatback assembly of claim 2, wherein the seatback trim assembly further comprises a lip disposed on an upper edge of the seatback trim assembly, wherein the lip is received beneath and behind the forward outer edge of the bezel.

5. The seatback assembly of claim 1, wherein the upper hood assembly further comprises a head restraint armature and the head restraint armature and the bezel are integrally fabricated from a polymeric material.

6. The seatback assembly of claim 1, wherein the upper hood assembly further comprises a head restraint received within a head restraint armature.

7. The seatback assembly of claim 6, wherein the seatback trim assembly further comprises a pair of lips disposed on an upper edge of the seatback trim assembly and the upper hood assembly further comprises a pair of bezels, wherein one of each of the pair of lips and one each of the pair of bezels is disposed on opposed sides of the head restraint and each of the pair of lips is received beneath and behind the forward outer edge of one of the pair of bezels.

8. The seatback assembly of claim 6, wherein the head restraint further comprises a vertically depending pair of posts and the upper hood assembly is operably coupled with an upper portion of the seatback support frame via the vertically depending pair of posts of the head restraint.

9. The seatback assembly of claim 8, wherein the seatback support frame of the seatback assembly further comprises a pair of head restraint guides that receive the pair of vertically depending posts of the head restraint of the upper hood assembly.

10. The seatback assembly of claim 1, wherein the seatback trim assembly comprises a seatback foam pad disposed upon a front portion of the seatback support frame and a trim cover disposed over the seatback foam pad.

11. The seatback assembly of claim 10, wherein the upper portion of the seatback trim assembly is substantially resilient and the bezel of the upper hood assembly is displaced into the seatback trim assembly when assembled to conceal an upper transition line between the seatback trim assembly and the seatback rear panel.

12. A seatback assembly comprising:
a seatback support frame;
a seatback trim assembly operably coupled with a front portion of the seatback support frame;
a seatback rear panel operably coupled with a rear portion of the seatback support frame; and
an upper hood assembly operably coupled with an upper portion of the seatback assembly, wherein the upper hood assembly comprises a head restraint received within a head restraint armature and a bezel incorporated into the upper hood assembly, the bezel being disposed and extending longitudinally between an upper portion of the seatback trim assembly and the seatback rear panel, and the bezel having a forward outer edge downwardly disposed against and in juxtaposed relation with the seatback trim assembly and a rear outer edge downwardly disposed against and in juxtaposed relation with the seatback rear panel.

13. The seatback assembly of claim 12, wherein the upper hood assembly further comprises:
a forward clam shell housing;
a rear clam shell housing; and
a substantially U-shaped frame member having a pair of vertically depending posts received within and secured between the forward clam shell housing and the rear clam shell housing, wherein the head restraint is operatively coupled with and supported by the substantially U-shaped frame member.

14. The seatback assembly claim 13, wherein the head restraint armature and the bezel are each integrally incorporated into and defined by each of the forward clam shell housing and the rear clam shell housing when the forward clam shell housing and the rear clam shell housing are assembled.

15. The seatback assembly claim 13, wherein the upper hood assembly further comprises a pair of bezels defining a pair of wings, each of the pair of wings extending substantially laterally outwardly from the seatback assembly and having a concealable fastener opening by which each of the pair of wings is attached to the seatback assembly.

16. The seatback assembly claim 15, wherein the seatback support frame of the seatback assembly further comprises a pair of head restraint guides that receive the pair of vertically depending posts of the upper hood assembly, and the seatback trim assembly further comprises a pair of lips disposed on an upper edge of the seatback trim assembly, wherein one of each of the pair of lips is disposed on opposed sides of the pair of vertically depending posts and each of the pair of lips is received beneath and behind the forward outer edge of one of the pair of bezels.

17. The motor vehicle seating assembly of claim 16, wherein the head restraint armature and the pair of bezels of the upper hood assembly further define a pair of handles disposed proximate and on opposed sides of the head restraint.

18. A method for assembling a seatback assembly comprising the steps of:
providing a seatback support frame;
attaching a seatback trim assembly over a front portion of the seatback support frame;
attaching a seatback rear panel over a rear portion of the seatback support frame; and
installing an upper hood assembly having a plastic bezel after the seatback trim assembly and seatback rear panel have been attached to the seatback support frame, wherein the plastic bezel of the upper hood assembly is disposed over an upper portion of the seatback trim assembly and the seatback rear panel, and whereby a forward outer edge of the plastic bezel is downwardly urged against the seatback trim assembly and a rear outer edge downwardly disposed against and in juxtaposed relation with the seatback rear panel to conceal a transition line between the seatback trim assembly and the seatback rear panel.

19. The method of claim 18, wherein:

the upper hood assembly further comprises a forward clam shell housing, a rear clam shell housing, and a substantially U-shaped frame member having a pair of vertically depending posts received within and secured between the forward clam shell housing and the rear clam shell housing, wherein a head restraint is operatively coupled with and supported by the substantially U-shaped frame member;

the seatback assembly further comprises a pair of head restraint guides that receive the pair of vertically depending posts of the upper hood assembly; and the step of installing the upper hood assembly further comprises the step of inserting the pair of vertically depending posts of the upper hood assembly into the pair of head restraint guides until the vertically depending posts of the upper hood assembly are seated within the pair of head restraint guides and the forward outer edge of the plastic bezel of the upper hood assembly is displaced into the seatback trim assembly to conceal an upper transition line between the seatback trim assembly and the seatback rear panel.

20. The method of claim 19, wherein the head restraint is received within a head restraint armature and the head restraint armature and the plastic bezel are each integrally incorporated in and defined by each of the forward clam shell housing and the rear clam shell housing when the forward clam shell housing and the rear clam shell housing are assembled.

* * * * *